(12) United States Patent  
McCabe et al.

(10) Patent No.: US 8,982,708 B1  
(45) Date of Patent: Mar. 17, 2015

(54) PRIORITY AWARE DYNAMIC ROUTING PROTOCOL FOR AD-HOC NETWORKS

(71) Applicants: Robert J. McCabe, Swisher, IA (US); Timothy J. Arganbright, Cedar Rapids, IA (US); Brian L. Aanderud, Carver, MN (US); Tyler J. Wilson, Springville, IA (US)

(72) Inventors: Robert J. McCabe, Swisher, IA (US); Timothy J. Arganbright, Cedar Rapids, IA (US); Brian L. Aanderud, Carver, MN (US); Tyler J. Wilson, Springville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 156 days.

(21) Appl. No.: 13/625,070

(22) Filed: Sep. 24, 2012

(51) Int. Cl.  
*G01R 31/08* (2006.01)

(52) U.S. Cl.  
USPC .......................................... 370/237; 370/216

(58) Field of Classification Search  
None  
See application file for complete search history.

(56) References Cited

U.S. PATENT DOCUMENTS

| | | | | |
|---|---|---|---|---|
| 6,141,319 | A * | 10/2000 | Dighe et al. | 370/218 |
| 6,535,498 | B1 * | 3/2003 | Larsson et al. | 370/338 |
| 6,961,310 | B2 * | 11/2005 | Cain | 370/238 |
| 7,330,440 | B1 * | 2/2008 | Bryant et al. | 370/254 |
| 7,414,977 | B2 * | 8/2008 | Orlik et al. | 370/238 |
| 7,898,979 | B2 * | 3/2011 | Isozu | 370/254 |
| 8,036,224 | B2 * | 10/2011 | Axelsson et al. | 370/395.21 |
| 8,700,666 | B2 * | 4/2014 | Bevan et al. | 707/791 |
| 2008/0025208 | A1 * | 1/2008 | Chan | 370/217 |
| 2009/0245234 | A1 * | 10/2009 | Parameswar et al. | 370/352 |

* cited by examiner

*Primary Examiner* — Robert Wilson  
(74) *Attorney, Agent, or Firm* — Angel N. Gerdzhikov; Donna P. Suchy; Daniel M. Barbieri

(57) ABSTRACT

A method determines an efficient route between a source node and a destination node in a mobile ad-hoc network. The source node and the destination node communicate over a control channel until a link event occurs, such as congestion or a link failure in the control channel. In response to the link event, the method begins probing the network for at least one alternative route between the source node and the destination node. The probing of the network, however, is limited based on a route metric, which includes information regarding the number of network nodes between the source node and the destination node and information regarding a required bandwidth necessary for the efficient route.

14 Claims, 6 Drawing Sheets

PRIORITY AWARE DYNAMIC ROUTING PROTOCOL FOR AD-HOC NETWORKS

BACKGROUND OF THE INVENTION

The increasing number of new users of distributed networks is increasing the demand for network services with a high level of quality of service (QoS). Furthermore, the increasing volume of multimedia traffic (i.e., voice video, image, and data) from these new users is driving a demand to deliver these services with an acceptable QoS. However, as the traffic over the network increases, the QoS of the network decreases. This currently presents a problem as traditional Internet Protocol (IP) networks provide "best-effort" service. In the public IP-based Internet, it is difficult to provide differentiated QoS for either individual applications or for different types of multimedia traffic. This lack of native QoS support often results in reduced and unacceptable levels of QoS; e.g., Voice-over-IP services with delays of several seconds, and videoconferences with jerky, low-quality video. While this level of service quality may be acceptable for individual use, it is inadequate for business and military needs.

Another trend in distributed networks, which compounds the problem, is the proliferation of wireless applications for voice, fax, paging, data, images, and video. The use of these wireless applications is expanding to global coverage through the use of satellite networks and in-flight data communications services on commercial airlines. These wireless networks generally have lower bandwidths and higher error-rates than traditional wired networks. However, mobile users still require the same QoS for their multimedia applications, whether they're at their desktop or in a tactical environment. Needless to say, mobility and wireless operation complicate the requirement of providing an acceptable end-to-end QoS.

One type of wireless network, in particular, the "ad-hoc," or Mobile Ad-Hoc Network (MANET) is particularly sensitive to these issues. MANETs are networks that may be deployed rapidly with little or no assistance and that do not have a central network structure, such as cellular-base stations or overhead satellite assets. The nodes within the MANETs are typically highly mobile and use a variety of wireless network platforms. Furthermore, nodes within the MANET may dynamically enter or leave the network. Therefore, the number of nodes and the disposition of nodes within the MANET are highly fluid and continually changing. By their nature, the MANET complicates the design and implementation of acceptable protocols to support communications between nodes within the network.

Ad hoc networking introduces several important difficulties for traditional routing protocols. First, determining a packet route requires that the source node know the reachability information of its neighbors. Second, the network topology may change quite often in an ad-hoc network. As the number of network nodes increases, the potential number of destinations becomes large, requiring large and frequent exchange of data (e.g., routes, routes updates, or routing tables) among the network nodes. Updates in the wireless communication environment travel over the air, and therefore, consume a great deal of network resources. As the network size increases and as the nodal mobility increases, smaller and smaller fractions of this total amount of control traffic are of practical usefulness. This is due to the fact that as the nodes become more mobile, the lifetime of a link decreases, and the period in which the routing information remains valid decreases as well. It is easy to see that for any given network capacity, there exists a network size and nodal mobility for which all the network capacity is wasted on control traffic.

Existing IP routing protocols that manage wireless networks can be classified either as proactive or as reactive. Proactive protocols attempt to continuously evaluate the routes within the network, so that when a packet needs to be forwarded, the route is already known and can be used immediately. The family of Link-State protocols, such as Optimized Link State Routing (OLSR), is one example of a proactive scheme. Reactive protocols, on the other hand, invoke a route determination procedure on demand only. Thus, when a route is needed, a global search procedure is employed. The classical flood-search algorithms are typical reactive protocols.

The advantage of the proactive protocols is that there is little delay involved in determining the appropriate route. In reactive protocols, the delay to determine a route can be quite significant. Furthermore, the global search procedure of the reactive protocols requires significant control traffic. Because of this long delay and excessive control traffic, pure reactive routing protocols may not be applicable to real-time communication in MANETs. However, pure proactive schemes are also not appropriate for MANETs, as they continuously use a large portion of the network capacity to keep the routing information current. And, as mentioned above, most of this routing information is never used since ad-hoc network nodes often move quite fast.

Thus, there is a need in the art for a hybrid, reactive and proactive, protocol that can be used with wireless ad-hoc networks that provides QoS routing within a hybrid routing protocol.

SUMMARY

According to the present invention, there is provided a method for determining an efficient route between a source node and a destination node in a mobile ad-hoc network. The source node and the destination node communicate over a control channel until a link event occurs, such as congestion or a link failure in the control channel. In response to the link event, the method begins probing the network for at least one alternative route between the source node and the destination node. The probing of the network, however, is limited based on a route metric, which includes information regarding the number of network nodes between the source node and the destination node and information regarding a required bandwidth necessary for the efficient route.

When the network probing is completed, the source node receives the efficient route from the destination node. An offload channel is established between the source node and the destination node so that the source node and the destination node can continue communicating, until such time that the control channel link between the source node and the destination node can be re-established.

The method also provides a way of deconflicting between two nodes that are seeking to establish an offload channel to the destination node. The method determines whether the destination node has received a first route request message from a first source node, and if it has, the second source node delays sending its route request message to the destination node until the first source node and the destination node have established their efficient route. In that regard, the first source node and the second source node have consistent views of the bandwidth of the network.

In another embodiment, the method weighs a plurality of alternative routes between the source node and the destination node to determine the efficient route. The destination node receives route information as a result of probing of the network from the source node. The destination node then chooses the efficient route from among the plurality of alternative routes based on a cost of each alternative route. The cost includes the available bandwidth on the alternative route, physical resource on the alternative route, common waveforms, and location information. The destination node then ranks the plurality of alternative routes, and then chooses the efficient route for the offload channel based on the ranking of the alternative routes.

In yet another embodiment, the method uses a proactive and a reactive protocol. The proactive protocol predetermines the number of network nodes between the source node and the destination node. The source node and the destination node communicate over a control channel until a link event occurs. The reactive protocol probes the network for at least one alternative route between the source node and the destination node, in response to the link event. The probing is efficiently conducted based on the proactive protocol's prior knowledge of the network. An offload channel is then established over the alternative route so that the source node and the destination node can continue communicating.

These and other aspects, features, and advantages of the invention will become apparent upon review of the following description taken in connection with the accompanying drawings. The invention, though, is pointed out with particularity by the appended claims.

DETAILED DESCRIPTION OF THE EMBODIMENTS

Figure 1:
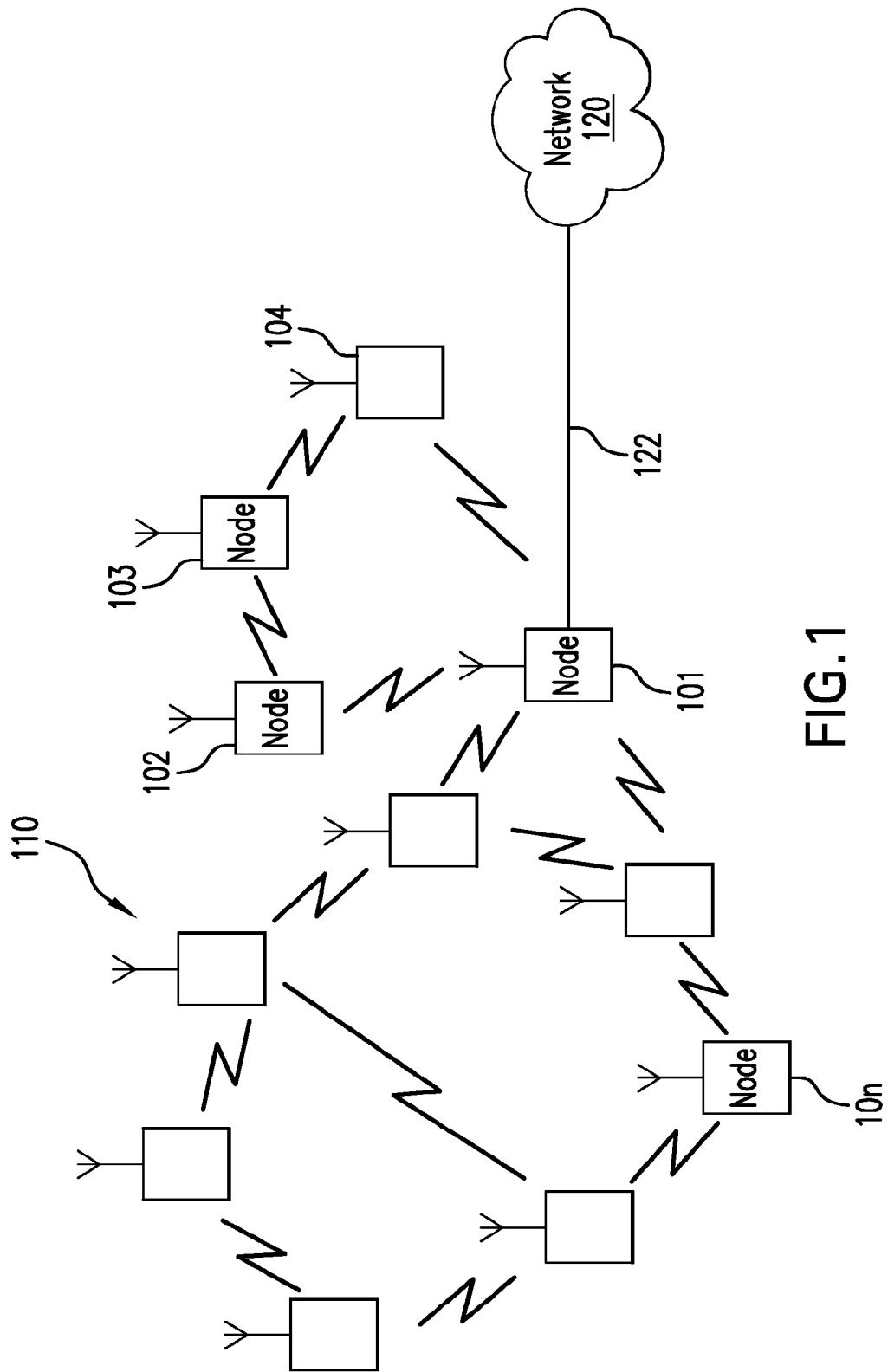
FIG. 1 is a schematic illustration of a non-limiting example of a wireless ad-hoc network topology.

The present invention is embodied in a software application program that manages routing between nodes in an ad-hoc network. The software application is known as "Dynamic Routing" (DR). FIG. 1 shows an example of a mobile multiple hop ad-hoc network 100. An ad-hoc network 100 is formed from a plurality of nodes or infrastructure elements 101, 102, 103, 104 . . . 10n that communicate wirelessly with each other and forward data traffic and control traffic for each other, in order to maintain the network traffic between the communicating end nodes and intermediate nodes. The lightning bolt symbol between adjacent nodes 101, 102, 103, 104 . . . 10n indicates that these nodes are one-hop RF neighbors. Sometimes, one or several gateways 101 are present in wireless ad-hoc network 100. This gateway 101 acts as a link between, for example, wireless ad-hoc network 100 and a standard fixed IP network 120 (e.g. the Internet). A connection 122 to the standard IP network may be either a fixed line, using, for example, an Ethernet network, or a fixed wireless connection.

Figure 2:
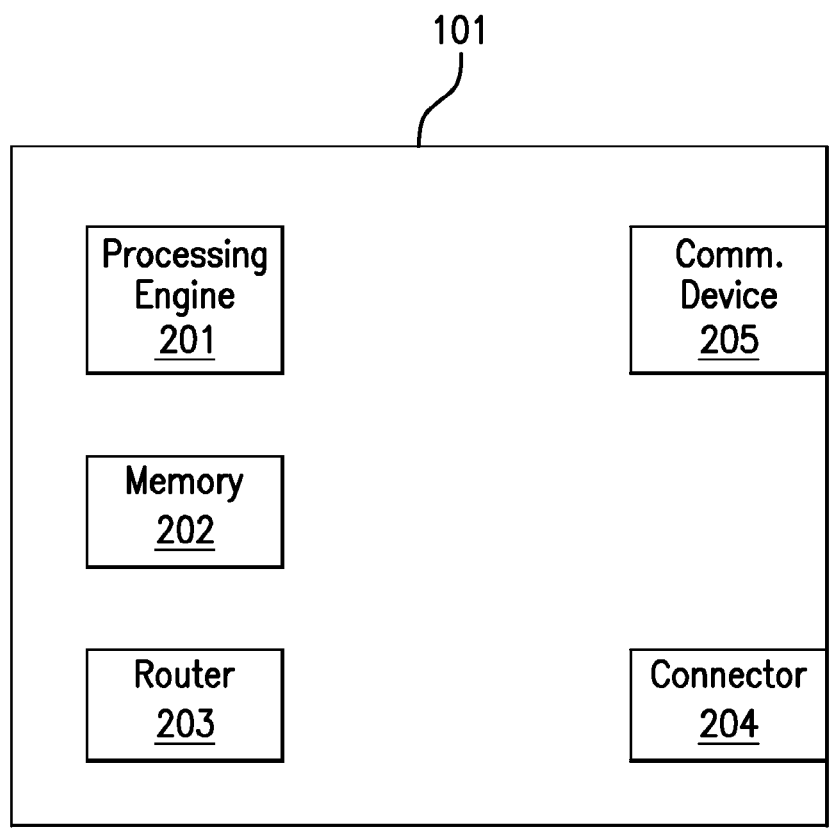
FIG. 2 is a schematic block diagram illustrating a non-limiting example node in the wireless ad-hoc network.

FIG. 2 shows a schematic block diagram illustrating an exemplary node 101 in wireless ad-hoc network 100. Node 101 includes a processing engine 201, a memory 202, a communication device 205, and a router 203. Communication device 205 can be wireless or use a wired connection. Router 203 is implemented with a routing algorithm, as described below, and normally both router 203 and/or communication device 205 are often embedded in node 101, but they can also be located in an external device connected node 101 through a connector 204.

Figure 3:
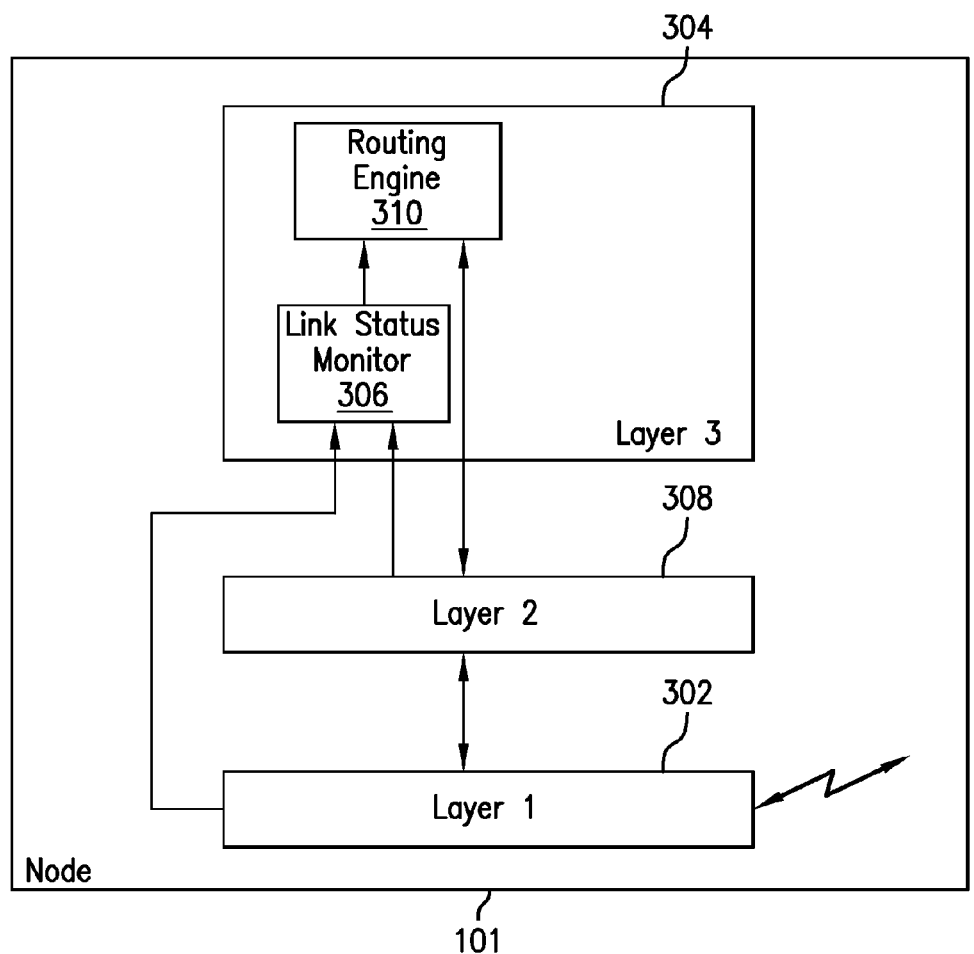
FIG. 3 is a schematic block diagram of some of the components of a node and their respective role in an inter-layered concept of a preferred non-limiting embodiment of the invention.

FIG. 3 shows the infrastructure of exemplary node 101 in wireless ad-hoc network 100 implemented in a layered network model, e.g. the Open Systems interconnection (OSI) model. Layer 1 (L1) 302, the physical layer, is responsible for the physical transmission of data bits and in this L1 302 there may be functionality to measure and obtain the status and quality of the properties of the physical medium, for example, the wireless radio channel status. This information is passed on to a third layer (L3) 304, the network layer, to a link status monitor 306.

A second layer (L2) 308, the data link layer, handles the transmission control of larger pieces of information and takes care of error handling detection and appropriate responses to errors. L2 308 may also provide the L3 304 with information about link quality since it handles the error detection.

Link status monitor 306 monitors the channel property and link quality information obtained from the L1 302 and L2 308. Link status monitor 306 may also receive information from an application layer or the hardware of node 101 that is relevant in a route determination process. Such information may be, for example, battery level or energy status of infrastructure nodes in the network in order to exclude such nodes in the routing path or at least reduce the amount of usage of such nodes. This exclusion is done in order to preserve the battery level of these nodes, since they may be client terminals and the clients/end users do not want their equipment to run out of energy for several reasons. There is also an increased risk that nodes with low battery levels may stop working soon.

Link status monitor 306 transmits the obtained and analyzed status information to a routing engine 310. Routing engine 310 has DR software architecture 400 (shown in FIG. 4) residing thereon to perform routing calculations to determine a route for the present data packet to be sent, it also determines when and how it should update the routing table. Routing engine 310 handles sending and receiving both data traffic and control traffic. It handles processing routing updates and initiates routing updates according to pre-determined schedules or from status information obtained from the link status monitor 306.

Figure 4:
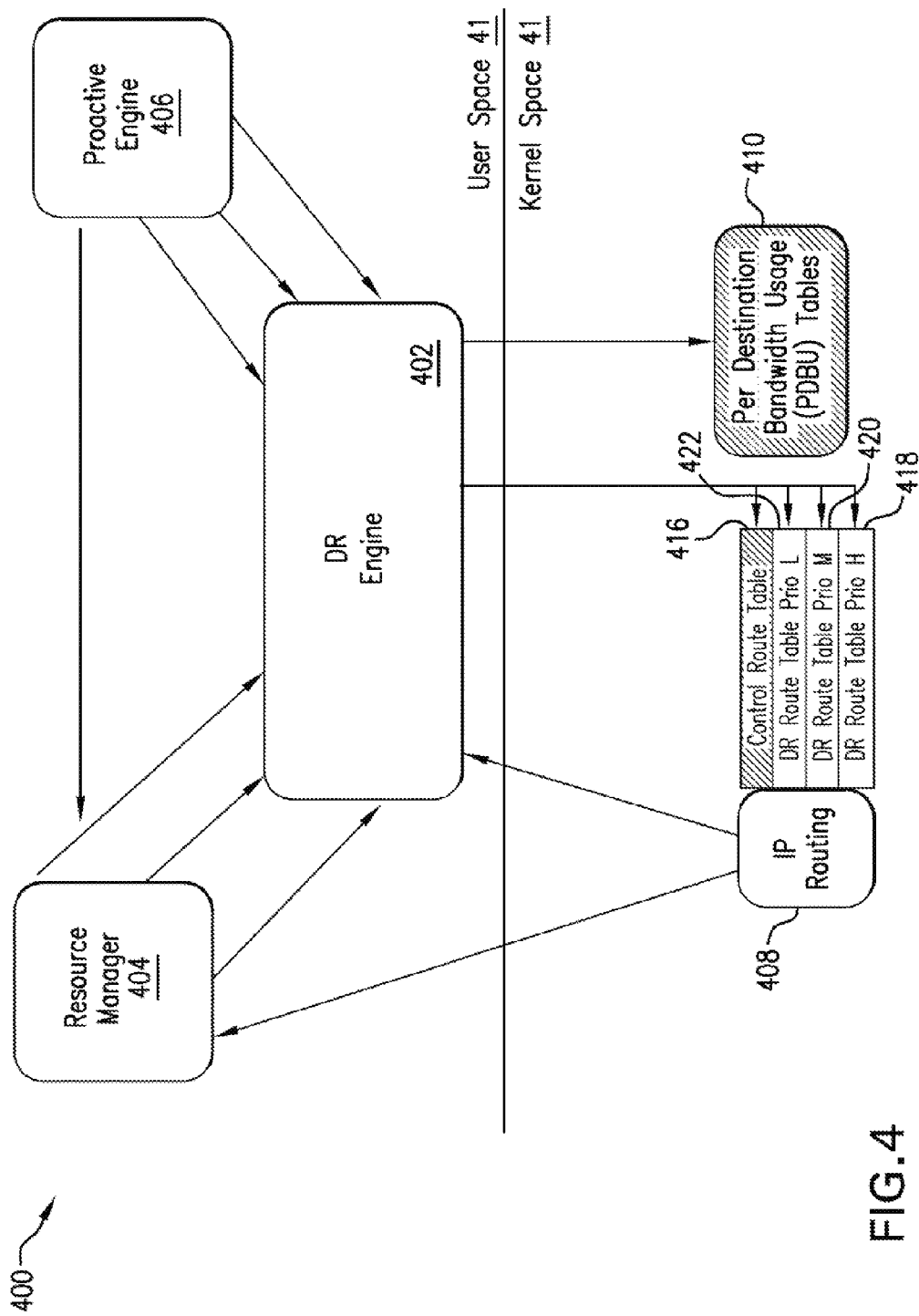
FIG. 4 is a schematic diagram illustrating an exemplary architecture for the present invention.

FIG. 4 is an illustration of DR software architecture 400. DR software architecture 400 is controlled by a DR engine 402, which initializes the software system parameters from a data file upon start up and initiates the DR software functionality. DR software functionality comprises a resource manager 404, proactive engine 406, IP forwarding mechanism 408, and source destination bandwidth usage (SDBU) tables 410. DR engine 402, resource manager 404, and proactive engine 406 all lie within a user space 412 rather than kernel space 414, which allows for flexibility in configuring software for use in various scenarios so that the DR system can be easily ported to wireless devices.

Resource manager 404 is a collection of protocols that provide dynamic spectrum allocation and management for ad-hoc network 100. Resource manager 404 can dynamically acquire and release network resources, such as routes and nodes, in an on-demand fashion to meet the communication requirements between nodes 101, 102, 103, 104 . . . 10$n$. These requirements are driven by increases and decreases in bandwidth between respective nodes 101, 102, 103, 104 . . . 10$n$, mobility changes that modify the ability of certain waveforms to close their respective link, and by user traffic priority. Resource manager 404 manages the waveform resources necessary to relay traffic to a given next hop location from one node 101, 102, 103, 104 . . . 10$n$ to another node 101, 102, 103, 104 . . . 10$n$. The term waveform refers to all the characteristics and behaviors of a particular radio communication protocol. The implementation of a particular waveform can be by software executing on programmed digital signal processors and/or general-purpose processors, logic programmed on field-programmable gate arrays (FPGAs) or a combination of the above. Each node 101, 102, 103, 104 . . . 10$n$ in ad-hoc network 100 can choose the particular waveform used to communicate information.

Figure 5A:
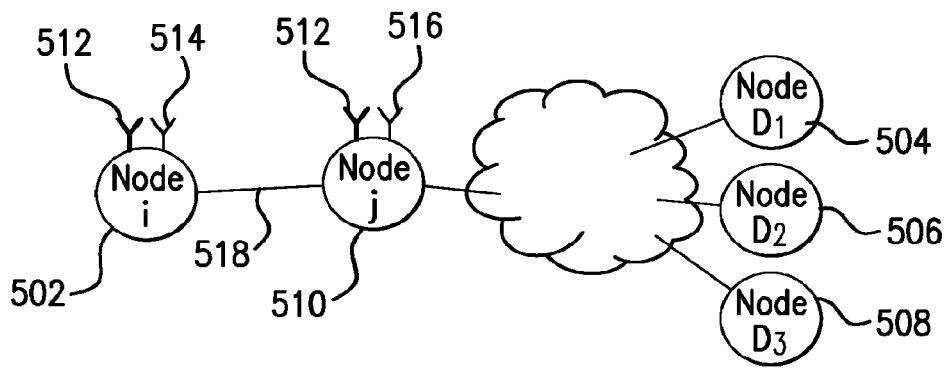
FIG. 5A is a schematic illustration of a tree of routes to determine the routes to a selected destination node.

FIG. 5A shows a tree of routes from a source node i 502 to a selected destination node $D_1$, $D_2$, or $D_3$, 504, 506, or 508, respectively, which can correspond with any node 101, 102, 103, 104 . . . 10$n$ in ad-hock network 100. Table 1 (below) is a routing table at node i 502 for a given priority. Traffic through node i 502 must pass through a node j 510 to get to selected destination node $D_1$, $D_2$, or $D_3$, 504, 506, or 508, respectively.

TABLE 1

| Dest | next hop |
|---|---|
| $D_1$ | j |
| $D_2$ | j |
| $D_3$ | j |

Node i 502's resource manager 404 monitors the bandwidth of the traffic through node j 510. Upon receipt of bandwidth information, resource manager 404 allocates or de-allocates bandwidth to node i 502's neighbor node j 510. Nodes i, j, $D_1$, $D_2$, and $D_3$, 502, 510, 504, 506, and 508, respectively, can communicate control information over control channel 518; however, resource manager 404 can only use waveforms that nodes i and j, 502 and 510, respectively, have in common when relaying data traffic.

If resource manager 404 is unable to allocate sufficient bandwidth to node j 510, resource manager 404 notifies DR engine 402 of a link event, which can be in the form of a "Link Allocation Failure" message. A Link Allocation Failure message can contain a neighboring identifier that corresponds with the offending link and bandwidth available on the offending link. In this example, the Link Allocation Failure message contains the identifier for neighboring node j 510 and specifies accessible bandwidth on the link. This notification triggers DR engine 402 to modify its routing tables so that some or all of the traffic is offloaded from the link between node i 502 and node j 510.

Figure 5B:
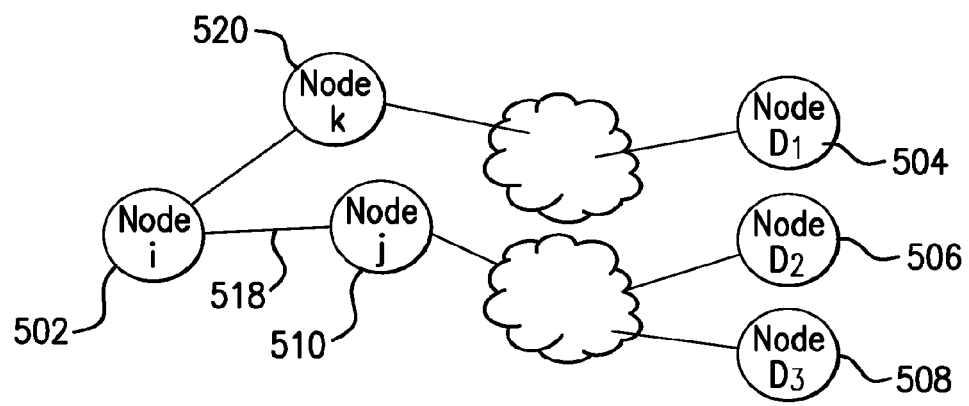
FIG. 5B is a schematic illustration of a tree of routes to determine the routes to a selected destination node.
Figure 6:
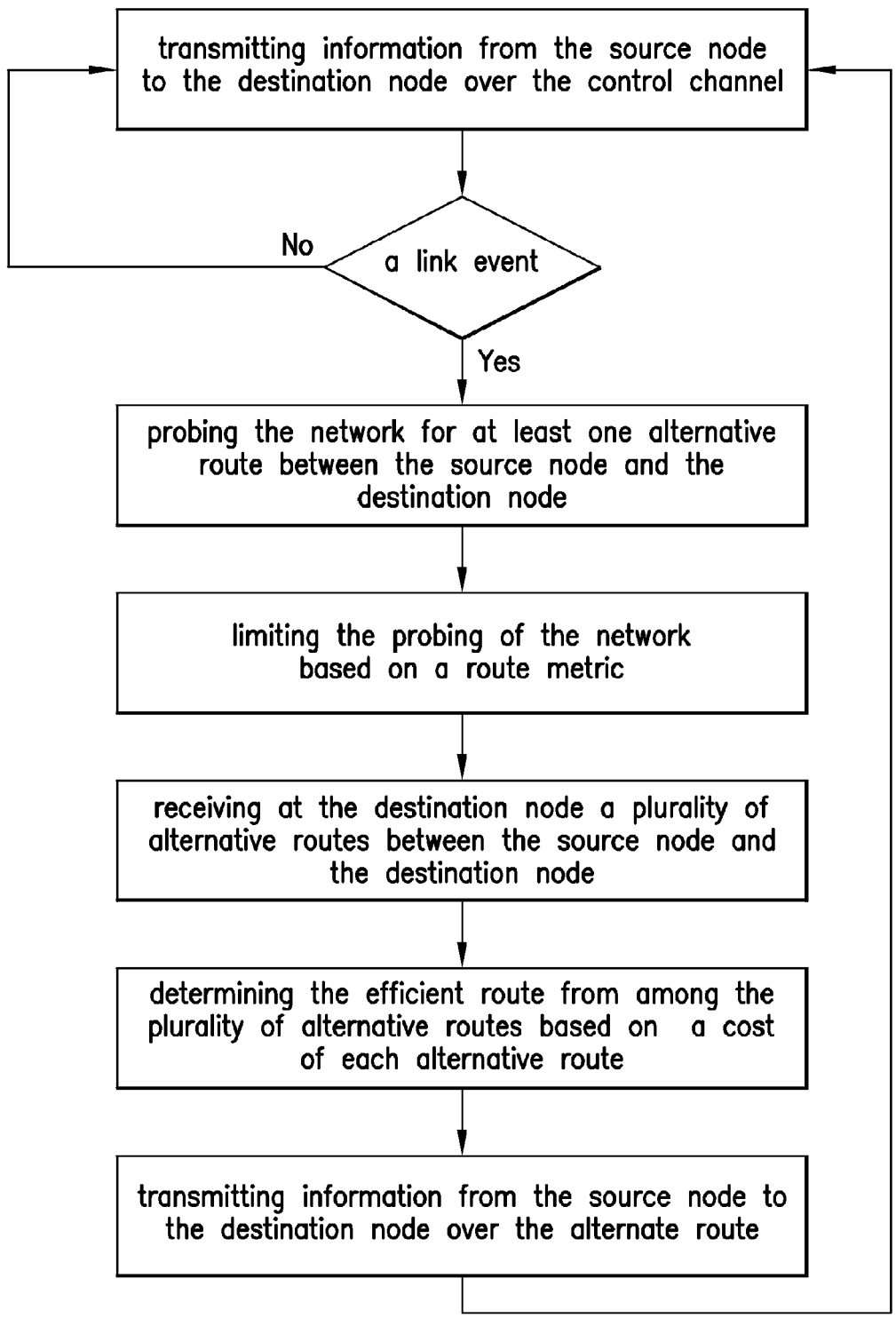
FIG. 6 is a flow chart illustrating a method for transmitting information from a source node to a destination node over a control channel in accordance with an embodiment of this disclosure.

FIG. 5B shows a tree of routes from a source node i 502 to a selected destination node $D_1$, $D_2$, or $D_3$, 504, 506, or 508, respectively. In this example, node i 502 has re-directed data traffic to node k 520. In determining the new route from node i 502 to $D_1$ 504, for example, each node along the path must query resource manager 404, for example, with a "Get Neighbor Info" message, and request and calculate the quality of the link. The quality of the link includes the available bandwidth between nodes i and k, 510 and 520, respectively, and the relative stability of the link therebetween. If at least one of nodes i and k, 502 and 510, respectively, is highly mobile or unreliable, then the link will not be considered the preferred or most efficient link.

Proactive engine 406 (FIG. 4) can have a link-state routing protocol, such as OLSR, which predetermines an optimized routing table based on collected data about available connectivity. Proactive engine 406 can use HELLO messages to find a node's 1-hop and its 2-hop neighbors through responses from 1-hop neighbors. Proactive engine 406 is a table driven protocol that exchanges topology information with other nodes on the network regularly. When proactive engine 406 detects a modification to the control routing table, it will send a newly calculated route table to DR engine 402. The newly calculated route table contains the destination network, the neighboring node or the next hop, the number of hops to destination node $D_1$, $D_2$, or $D_3$, 504, 506, or 508, respectively, and the type of interface.

Proactive engine 406 maintains the control route table 416. Control route table 416 is cached by DR engine 402 and stored in IP forwarding mechanism 408. Control route table 416 routes control traffic over the control channel. Control route table 416 provides reachability information to other routing protocols, intelligently prunes route request packets that exceed a predetermined number of hops based on the number of nodes between source node i 502 and destination node $D_1$, $D_2$, or $D_3$, 504, 506, or 508, respectively, from DR engine 402, so they are not flooded over the entire network, and reduces the end-to-end delay associated with the reactive component of DR engine 402 by sending qualified user traffic over the control channel before routing protocol of DR engine 402 is initiated.

Proactive engine 406 can be modified to optimize the amount of bandwidth that is consumed with proactive engine 406's protocol messages. Proactive engine 406 can be modified to send only full Topology Control (TC) messages when a node has detected a change in a neighboring node. At the steady state condition, a node will only send out periodic TC messages with a sequence number representing the current connectivity. Further, Hazy-Sighted Link State (HSLS) extensions can be incorporated into the TC distribution to reduce the amount of times that HSLS messages are flooded over ad-hoc network 100. In addition, proactive engines 406's HELLO and TC messages are efficiently packed with messages from DR engine 402. These optimizations to proactive engine 406 can drastically reduce the amount of bandwidth that the proactive engine 406 consumes. Proactive engine 406 also maintains control route table 416 for each node 101, 102, 103, 104 . . . 10$n$ and redistributes routing information, so that external networks are aware of each other.

Control route table 416 (maintained by Proactive Engine 406) is the backbone through which selected nodes relay routing data through network 100. This backbone can be utilized for efficient dissemination of control information. Routes are used only for initial communication between respective nodes 101, 102, 103, 104 . . . 10$n$ until a more suitable route, i.e. an offload channel, is required and discovered by DR engine 402. These routes are generated purely based on hop count and may not be the best candidates for transporting specific types (e.g. high bandwidth, low latency, high priority, low priority, etc.) of user data. DR engine 402, the reactive component, has the primary responsibility of routing user traffic.

DR engine 402 is the reactive component of DR software architecture 400. DR engine 402 maintains its own routing tables, one for each priority High (H), Medium (M), and Low (L) 418, 420, and 422, respectively. This is done to allow separation between the different priorities at the routing level. Qualified traffic with a given priority as determined by the type of service will be directed to the appropriate DR Route Table 418, 420, 422, respectively. Some types of traffic, is never eligible for offloading from the control channel to the offload channel. Such traffic is considered non-qualified traffic, and it will always remain on the control channel regardless of its priority.

An update to DR routing tables 418, 420, and 422 is triggered by a link event from resource manager 404 to DR engine 402. The link event can be due to congestion in the control channel or a link failure. On notification of the link event, DR engine 402 consults SDBU 410 to determine the bandwidths per source node i 502 and destination node $D_1$, $D_2$, or $D_3$, 504, 506, or 508, respectively, utilization for the affected neighboring node (indicated in the Link Alloction Failure message). These bandwidths are used to determine which destination is offloaded. After this determination, DR engine 402 probes the ad-hoc network 100 for a better route to destination node $D_1$, $D_2$, or $D_3$, 504, 506, or 508, respectively.

DR engine 402 uses routing messages to probe ad-hoc network 100 for alternative routes in response to a link event, to modify existing routes, or for notifying initiating network nodes that a route is down. Route messages can be sent by way of the user datagram protocol (UDP) using an implementation-defined port number. DR engine 402 transfers packets through its Radio Network Interface, so that the source of all route messages is the address of this interface. The destination of the route messages can be either unicast (to another node's Radio Network Interface) or efficiently disseminated throughout ad-hoc network 100, depending on the scenario. All route messages include the remaining number of hops this message is allowed to traverse, as determined by the proactive routing protocol, in an effort to limit probing of ad-hoc network 100, which conserves valuable bandwidth resources.

A number of data structures are used within DR software architecture 400 to efficiently store and organize data. A per-route set of initiators includes either: (i) the network address of the radio network interface or another unique identifier used to represent the initiator; or (ii) a timer that is reset every time the node sees qualified traffic from the initiator, which uses this routing table entry. Upon timeout, the initiator entry is removed from the initiator list.

A data structure for a route represents a row in one of DR routing tables 418, 420, or 422, respectively. Each route entry has one or more of the following: (i) the destination network associated with the routing table entry; (ii) the next hop address for the neighboring node on the path to destination node $D_1$, $D_2$, or $D_3$, 504, 506, or 508, respectively; (iii) the initiator set as described above; (iv) the efficient route determined by destination node $D_1$, $D_2$, or $D_3$, 504, 506, or 508, respectively; (v) a flag that indicates that this route was created via the DR protocol; and(viii) a flag indicating the last time this DR route has been modified in order to avoid changing the route tables too often.

A route table data structure is a collection of route table entries (described above). The route table data structure stores DR route tables 418, 420, and 422, for a given priority L, M, and H, respectively. There can be at least three ways for referring to the route table: (1) by its destination network; (2) by its destination address; or (3) by its next hop or neighboring node's address.

Proactive engine 406 has a route table that includes the destination network, the next hop address, and the number of hops to reach the destination address. The route table for proactive engine 406 is cached in DR engine 402.

A Host and Network Association (HNA) database has a data structure that stores mapping between the networks tunnel setup protocol (TSP) and the address for which the TSP is responsible. This information is derived from the subnet mask of the TSP's host interface and through proactive engine 402's HNA messages. The HNA data structure contains the source network address and a list of identifiers representing each router responsible for the source network.

SDBU table 410 further includes a user-space application program that monitors the bandwidth of each source/destination address corresponding to qualified traffic forwarded by the node and stores the result in a sub-table indexed by the node's respective next hop and priority of the communication, and ordered by decreasing bandwidth. A next hop sub-table in SDBU table 410 is consulted upon getting a Link Allocation Failure from resource manager 404. The next hop table indicates, which routing table entries are good candidates for modification, i.e., offloading to new next hops or neighboring nodes. An entry to SDBU table 410 is comprised of a source and destination address an average bandwidth anticipated for the traffic sent to the destination address, and, optionally, an indication of the traffic growth indicating either the propensity of this traffic to grow or the variability of this traffic. SDBU table 410 only accounts for "active" traffic, i.e. traffic that is not dropped due to policing or other rules.

An ingress destination bandwidth utilization table (IDBU) table at each network node 101, 102, 103, 104 ... 10n can be used to monitor priority and traffic to each destination. Unlike SDBU table 410, the IDBU table does not have sub-tables for each next hop to a neighboring node 101, 102, 103, 104 ... 10n. The IDBU table is a flat table keyed by the destination network node $D_1$, $D_2$, or $D_3$, 504, 506, or 508, respectively, and only considers traffic that originated either on network node 101, 102, 103, 104 ... 10n or was received on the node's host interface. Furthermore, the IDBU table accounts for all such traffic, i.e., traffic actively being forwarded and traffic being dropped or policed.

A route discovery table keeps track of the route discovered through the route request (RREQ) messages. This table is indexed by the destination network for the RREQ message, the priority of the RREQ message, and, optionally, the sequence number for the RREQ message. This table is used to coordinate the route discovery procedure for the destination network. Specifically, this table provides a deconfliction mechanism to prevent the current node from sending a RREQ message while another RREQ message to the same destination/priority is in process by allowing the initiating nodes to see consistent views of the bandwidth of network 100. Additionally, it handles re-transmission of RREQ messages. Entries in this table include the destination network, the priority the received RREP message, the number of time the route discovery has been attempted with no success, the minimum bandwidth that the current node needs from the winning path, and a timer set to expire when the entry should be removed, the timer refers to the number of hops the RREQ message can progress between neighboring network nodes, and is based on an estimate of the number of hops between source node 1502 and destination node $D_1$, $D_2$, or $D_3$, 504, 506, or 508, respectively, from the routing table of proactive engine 406.

Each node that receives a RREQ message maintains a route request table. This table is indexed by an identification of source node i 502 initiating the RREQ message, the destination network, the priority, and, optionally, the sequence number. This table is used to prune the number of RREQ messages that are forwarded by the current node by storing a metric of the best path up to the current node. Entries in this table include, an identification of source node i 502 initiating the RREQ message, the destination network, the priority, a best metric value summarizing the best routes that the current node has received, the winning path or the most efficient route, and an expiration timer set to expire when the entry should be removed.

Each node that receives a RREP message maintains a route reply table that accounts for the route the current node has processed. This table is indexed by the destination network and the priority. A node initiating a RREQ uses this table to determine the most efficient route among the alternative available routes. Entries in this table include an id for the RREP message, the destination network, the priority, a value summarizing the winning path or the most efficient route corresponding to the "best" RREP the current node has received, the most efficient route the current node has received, and a expiration timer set to expire when the entry should be removed.

The following is a non-limiting exemplary embodiment for the messages that are used to probe ad-hoc network 100 and set up an offload channel between source node 1502 and destination node $D_1$, $D_2$, or $D_3$, 504, 506, or 508, respectively. Probing is carried out by a RREQ message from source node i 502. A RREQ message is used to probe ad-hoc network 100 for a route from an initiator node, i.e. an origination node or source node i 502, to destination node $D_1$, $D_2$, or $D_3$, 504, 506, or 508, respectively. The RREQ message is broadcast hop-by-hop from a network node to its neighboring network node toward destination node $D_1$, $D_2$, or $D_3$, 504, 506, or 508, respectively, gathering information and assessing the possibility of an alternative path up to that point. The RREQ message will solicit a Route Reply (RREP) message from destination node $D_1$, $D_2$, or $D_3$, 504, 506, or 508, respectively.

The RREQ message contains an identifier for source node i 502. The RREQ message contains the priority of communication, i.e. High (H), Medium (M) or Low (L), depending on the route error, and the bandwidth that is required for the alternative route. Information about the available additional bandwidth for the alternative route can also be included. Each node will build up this value as it forwards the RREQ message to its neighboring node, which can then be used by destination node $D_1$, $D_2$, or $D_3$, 504, 506, or 508, respectively, in deciding the winning path, i.e. the most efficient route. Destination node $D_1$, $D_2$, or $D_3$, 504, 506, or 508, respectively, chooses the most efficient route based on either a number or the route metrics. The route metrics includes the route's ability to handle the prescribed bandwidth, the type of waveforms it can handle, the number of hops in the route, locational information for each node along the route, for example, whether the node is on the ground or in the air or if the node is static or mobile, additional route metrics can also be included. The route metrics represents a cost associated with using a particular route. A route that uses, for example, a highly mobile node may have a higher cost than a route that uses fixed nodes. In that regard, the lower cost route that traverses fixed nodes may be the most efficient route with the lowest cost.

Destination node $D_1$, $D_2$, or $O_3$, 504, 506, or 508, respectively, generates a route reply (RREP) message for the source node i 502. The RREP message can be either unicast hop-by-hop toward source node i 502 of the RREQ message or is unicast to the originator itself. The RREP message contains an identifier for the source node i 502 that initiated the RREQ message, and the destination network of destination node $D_1$, $D_2$, or $D_3$, 504, 506, or 508, respectively, associated with the RREQ message. The RREP message can also contain the priority of the communication, i.e. High (H), Medium (M) or Low (L), depending on the RREQ. The RREP message also contains the most efficient route, as decided by destination node $D_1$, $O_2$, or $D_3$, 504, 506, or 508, respectively, of the corresponding RREQ message, for establishing the offload channel for the affected communications. The RREP message for the efficient route can include or exclude bandwidth information for the link in certain cases. The RREP message can also include a flag indicating that this RREP should solicit a route reserve (RRES) message from the source of the RREQ message.

A route reserve (RRES) message can be generated under certain situations in response to a non-local RREQ message, i.e. a route to a node beyond a MANET network, by having source node i 502 determine the best route and send a RRES message to all other nodes along the efficient route. The RREP message is unicast hop-by-hop toward source node i 502 of the RREP message. The RRES message can include an identification of source node i 502 that initiated the RRES message and the destination network containing destination node $D_1$, $D_2$, or $D_3$, 504, 506, or 508, respectively. The RRES message can also contain the priority of the communication, i.e. High (H), Medium (M) or Low (L), depending on the RREP message. Furthermore, the RRES message can include a list of links and/or nodes in the most efficient path.

A route error (RERR) message can also be generated when certain failure scenarios occur. For example, RERRs are generated when a MANET node receives a Link Allocation Failure notification from its local Resource Manager. The RRER message either can be unicast toward destination node $D_1$, $D_2$, or $D_3$, 504, 506, or 508, respectively, or broadcast throughout ad-hoc network 100. The RERR message can include an identification of source node i 502 that initiated the RERR message, and a list of the destination network address requiring routing modification by a corresponding initiating node. Each destination in the list of destinations can indicate the affected communication priorities, i.e. High (H), Medium (M) or Low (L), and the allowable bandwidth the initiator can send to a given destination and priority. Furthermore, the RERR message can also indicate when a route is fatally encumbered, and affected destination nodes $D_1$, $D_2$, or $D_3$, 504, 506, or 508, respectively, must be moved to a different, alternative route.

DR engine 402 can be configured to handle routing messages in a variety of manners. A non-limiting example of how DR engine 402 handles routing messages follows the terminology used in describing how DR engine 402 handles routing messages.

Terminology

Qualified Traffic: packets with a type of service (TOS) indicating that the traffic is a candidate for offloading from control routing table to an offload channel.

Originating Node (OrigNode): An ingress point into the network for traffic. This ingress point coordinates with DR engine 402 on behalf of the traffic's original source. OrigNode is also used to refer to the originator of a particular DR message and may be referred to as source node i 502.

Target Node (TargetNode): The TargetNode is the ultimate destination of a DR message. TargetNode may be referred to as destination node $D_1$, $D_2$, or $D_3$, 504, 506, or 508, respectively.

This Node (ThisNode): ThisNode corresponds to the router process currently performing a calculation or attending to a message.

Host Interface: Interface connected to the user network.

Radio Network Interface: Interface used by the routers to talk wirelessly (using a variety of waveforms).

Responsible for 192.X.Y.0/24: Means the 192.X.Y.0/24 network is reachable by ThisNode's Host Interface.

Link Allocation Failure (LAF): An indication from resource manager 404 that it was unable to allocate the required amount of bandwidth on a given link, e.g., ThisNode→i. This indication includes the tuple Neighborld, UnsupportedBWList).

Resource manager (RM) 404: A collection of protocols that manage the per-link waveform parameters required for communication.

Initiator: A router that is responsible for sourcing traffic to a given destination.

Multi-Point Relay (MPR): A router designated by proactive engine 406 to be part of the network backbone.

HNA: Host and Network Association. Proactive engine 406 periodically sends HNA packets so to distribute routing information gleaned on the host interface.

TSP: Short for Traffic Shaper. The TSP handles the routing functions for the network and the DR engine 402 runs on this module.

Winning Path: The "best" path or most efficient route between a source node i 502 and destination node $D_1$, $D_2$, or $D_3$, 504, 506, or 508, respectively, (as decided by the source and/or destination).

Responding to RREQ Messages

A non-limiting example of how DR engine 402 handles responding to RREQ messages is as follows:
First, if
   ThisNode is not responsible for RREQ.DestNetwork and RREQ.TTL==0,
   OR if ThisNode==RREQ.OrigId
   OR if ThisNode is contained in RREQ.LinkBWList.
then the RREQ is discarded and further processing is stopped.

Next, say ThisNode receives this RREQ from PrevNode. If PrevNode==RREQ.OrigId, then RREQ.Link_BW_List will be empty, otherwise RREQ.Link_BW_List=( . . . , <PrevPrevNode->PrevNode, $LinkBW_{PrevPrevNode\_PrevNode}$>) where PrevPrevNode was the node replaying the RREQ to PrevNode. ThisNode MUST add an entry for the link PrevNode→ThisNode. To do this DR queries RESOURCE MANAGER 404 for the available bandwidth for traffic of priority=RREQ.Priority between PrevNode and ThisNode over all waveforms the two nodes have in common (see the "Neighbor Info" query):
availBwOnLink=getAvailableBandwidthOnLink(PrevNode,RREQ.Priority) (This function tell the requester how many lower priority sockets need to be moved to achieve availBwOnLink. The route metric can be raised on this link if there are to many lower priority sockets)
Next, availBwOnLink is augmented by RREQ.ExistingTxAlloc:
availBwOnLink+=RREQ.ExistingTxAlloc
If ThisNode is responsible for RREQ.DestNetwork then ThisNode appends
<PrevNode→ThisNode, availBwOnLlnk> to RREQ.Link_BW_List. Otherwise, ThisNode appends<PrevNode→ThisNode, availBwOnLink/2> to RREQ.Link_BW_List. The RESOURCE MANAGER 404-reported bandwidth is divided by 2 to account for the relaying cost.
Next, ThisNode assigns a metric to the path from RREQ.OrigId to ThisNode:
   path_metric=calculatePathMetric(RREQ.Link_BWList, RREQ.BW_Required)
If there is not already an entry for (RREQ.OrigId, RREQ.DestNetwork, RREQ.Priority) in the RouteRequestTable then an entry is inserted in the table and
   TimerSet(
   RouteRequestTableRRREQ.OrigId,RREQ.DestNetwork,
     RREQ.PriorityqE xpiryTimer,
   now+route_request_expiry_time
   )
Where
route_request_expiry_time=ROUTE_REQUEST_EXPIRY if ThisNode is not responsible for RREQ.DestAddr and route_request_expiry_time=ROUTE_REPLY_RESPONSE_TIME otherwise.
If there is already an entry for (RREQ.OrigId,RREQ.DestNetwork,RREQ.Priority) in the RouteRequestTable, and if RouteRequestTable[(RREQ.OrigId,RREQ.DestNetwork, RREQ.Priority)].BestMetric<path_metric
Then, the RREQ is discarded and further processed is stopped. Otherwise, RouteRequestTable[(RREQ.OrigId, RREQ. DestNetwork, RREQ. Priority)]. BestMetric=path_metric
RouteRequestTable[(RREQ.OrigId, RREQ.DestNetwork, RREQ.Priority)].WinningPath=RREQ.LinkBWList
Then, if ThisNode is not responsible for RREQ.DestNetwork it will:
(i) Determine its own existing transmit allocation for traffic destined to DestNetwork and embed it in the RREQ:
   RREQ.ExistingTxAlloc=getTransmitUtilization-
     ForinitiatorDestNetwork(RREQ.OrigId, RREQ.DestNetwork, RREQ.Priority)
(ii) Decrement the RREQ.TTL by one; and
(iii) Pass the RREQ to the network stack with the directive that it is to be broadcast.
Otherwise, if ThisNode is responsible for RREQ.DestNetwork further action is deferred to the expiration of the route request entry's ExpiryTimer.

In the event of contention between network nodes for routes, the number of overheard RREQ can be recorded, i.e. if ThisNode sees a lot of RREQ messages it could choose to backoff more before it sends its own RREQ message. Alternatively, contention can be resolved by deterministically backoff by all nodes receiving RRER messages and Rate-Limiting the RREP message a given node will accept.

Responding to RREP Messages

A non-limiting example of how DR engine 402 handles responding to RREP messages is as follows:
First, ThisNode will ensure that it is listed on the RREP.WinningPath. If this is not the case, the message is discarded and further processing is stopped.
Next, if ThisNode is not the first node on the RREP.WinningPath, it will update its route to the destination by inspecting the RREP.WinningPath. Suppose that the list of nodes on the RREP.WinningPath is
(OrigNode, . . . , PrevNode, ThisNode, NextNode, . . . , TargetNode)
then ThisNode will update its priority=RREP.Priority route entry to RREP.DestNetwork so the next hop is NextNode (see the Route Entry Update section for details).
Next, if ThisNode is not the first node on the RREP.WinningPath, and if RREP.TTL==0, the message is dropped and no further processing is done.
Otherwise if ThisNode is not the first node on the RREP.WinningPath and if RREP.TTL >0 ThisNode will decrement RREP.TTL and will pass the RREP to the network stack with the directive that it is unicast to the previous node along RREP.WinningPath (PrevNode in the example above) and no further processing is done.

If ThisNode is the first node on the RREP.WinningPath (OrigNode in the example above), it will flag the RouteDiscoveryEntry as having received a RREP and reset its route request timer:

RouteDiscoveryTable([(RREP.DestNetwork,RREP.Priority)].Recevied_RREP=TRUE TimerReset(
    RouteDiscoveryTable[(RREP.DestNetwork,RREP.Priority)].ExpiryTimer, now +MINIMUM_ROUTE_DISCOVERY_RETRY_TIME
)
Next if RREP.NeedRouteReserve==FALSE ThisNode will update its
priority=RREP.Priority route entry to RREP.DestNetwork so the next hop agrees with the first link in RREP.WinningPath and no more processing is done on the packet. Otherwise, ThisNode assigns a metric to the RREP.WinningPath:
    path_metric=calculatePathMetric(RREP.WinningPath,
        RouteDiscoveryTable[(RREP.DestNetwork,RREP.Priority)].BW_Required)
If there is not already an entry for (RREP.DestNetwork, RREP.Priority) in the RouteReplyTable then an entry in inserted in the table and ThisNode sets a timer to initiate the Route Reservation Procedure:
    TimerSet(
        RouteReplyTable[(RREP. DestNetwork, RREP. Priority)]. ExpiryTimer, now+ADDITIONAL_RREP_TIME
    )
If there is already an entry for RREP.DestNetwork and if
RouteReplyTable[(RREP.DestNetwork,RREP.
Priority)].BestMetric<path_metric
Then, the RREP is discarded and further processing is stopped. Otherwise,
    RouteReplyTable[(RREP.DestNetwork,RREP.
        Priority)].BestMetric=path_metric
    RouteReplyTable[(RREP.DestNetwork,RREP.
        Priority)].WinningPath=RREP.Link_BW_List
and further action is deferred to the expiration of the route reply entry's ExpiryTimer.

Responding to RRES Messages

A non-limiting example of how DR engine 402 handles responding to RRES messages is as follows:
First, ThisNode will ensure that it is listed on the RRES.WinningPath. If this is not the case, the message is discarded and further processing is stopped.
Next, if ThisNode will update its route to the destination by inspecting the RREP.WinningPath. Suppose that the list of nodes on the RREP.WinningPath is
(OrigNode, . . . , PrevNode, ThisNode, NextNode, . . . ,SecondToLastNode,TargetNode)
then ThisNode will update its priority=RRES.Priority route entry to RREQ.DestNetwork so the next hop is NextNode.
Next, if ThisNode is the SecondToLastNode on the RREP.WinningPath OR if RREP.TTL==0, the message is dropped and no further processing is done.
Otherwise, ThisNode will decrement RREP.TTL and will pass the RREP to the network stack with the directive that it is to be unicast to the next node along RREP.Winning Path (NextNode in the example above) and no further processing is done.

Responding to RERR Messages

A non-limiting example of how DR engine 402 handles responding to RRER messages is as follows:
First, ThisNode examines the RERR to see if it is listed in the RERR. InitiatorsList. Otherwise, the RERR is not processed further but it is considered for forwarding as discussed below.
If the RERR.Fatal flag is set ThisNode MUST initiate the Route Discovery procedure for each destination network and priority listed in the RERR.InitiatorsList[ThisNode]. Specifically:

Foreach (destNetwork,priority,allowableBw) in RERR.InitiatorsList[ThisNode]:
        IngressTablepriority[destNetwork].PoliceRate= allowableBw
        SendRreqTime=getRreqBackoffTime(thisNode,destNetwork,priority,RERR.Initiators List)
    routeDiscoveryProcedure(destNetwork,priority,sendRreqTime)
If the RERR.Fatal flag is not set the Route Discovery procedure is OPTIONAL.
Next, the RERR is considered for forwarding. If the TTL==0, the RERR is not forwarded. Otherwise, the RERR.TTL is decremented by one and is re-broadcast out ThisNode's radio network interface.

Route Discovery Procedure

A non-limiting example of how DR engine 402 handles the route discovery procedure is as follows:
The route discovery procedure is invoked when a new DR route needs to be acquired for a destination address, e.g., when a RERR message is received. This procedure is invoked with 3 arguments:
(1) DestNetwork—The destination network which needs the routing modification.
(2) Priority—The priority of the traffic that needs to be off-loaded.
(3) SendRreqTime—Time after which the route discovery procedure is initiated that the RREQ should be sent. SendRreqTime can be IMMEDIATE in which case the RREQ will be sent immediately.
First, ThisNode will check to see if the RouteDiscoveryEntry for (DestNetwork,Priority) already exists in the RouteDiscoveryTable. If so, this means that there is a route request already in progress for (DestNetwork,Priority). In this case, no more processing is done.
Next, ThisNodes makes sure the route entry
    RouteTable$_{Prority}$[DestNetwork]
exists. If not, this is an error condition.
Next, ThisNode will create a RouteDiscoveryEntry and add it to the RouteDiscoveryTable. Then, ThisNode will examine and store the IDBU$_{Priority}$[DestNetwork] entry for the Priority bandwidth ThisNode is originated to DestNetwork. Then, ThisNode sets a timer that will expire at current_time+SendRreqTime. Upon expiry of this timer, ThisNode will form a RREQ with RREQ.OrigId set to ThisNode's address, RREQ.DestNetwork set to DestNetwork and RREQ.Priority set to Priority. The RREQ.BW_Required value is derived from the previously stored bandwidth fromIDBU$_{Priority}$[DestNetwork] entry—ThisNode MUST set RREQ.BW_Required>=
    IDBU$_{Priority}$[DestNetwork]. If indicated byIDBU$_{Priority}$[DestNetwork], RREQ.TrafficFlags MAY be set accordingly. RREQ.Link_BW_List set to an empty list.
Next, ThisNode's existing transmit allocation for traffic destined to DestNetwork is determined and indicated in the RREQ:
    RREQ.ExistingTxAlloc=
    getTransmitUtilizationForinitiatorDestNetwork(RREQ.OrigId, RREQ.DestNetwork,
        RREQ. Priority)
OPTIONALLY, ThisNode can set RREQ.TTL to something other than MAXIMUM_TTL. For example, the distance to DestNetwork is readily available to ThisNode (via the control route table), and can be used to set RREQ.TTL so to reduce the network overhead caused by nodes re-broadcasting the RREQ.

Next, the RREQ will be passed to the network stack with the directive that it is to be broadcast. ThisNode will add a RouteDiscoveryEntry to the RouteDiscoveryTable and set a RREQ-retry timer:

TimerSet(
   RouteDiscoveryTable[(RREQ. DestNetwork, RREQ. Priority)]. ExpiryTimer, now+MAXIMUM_RREQ_RESPONSE_TIME
)

Response to Route Discovery Timer Expiry

A non-limiting example of how DR engine 402 handles the route discovery timer expiration is as follows:
If RouteDiscoveryEntry.Received_RREP==TRUE, ThisNode will set a timer to expire at current_time+ROUTE_DISCOVERY_HOLDOFF_TIME. Upon expiry of this timer, the RouteDiscoveryEntry will be removed from the RouteDiscoveryTable. No more action is taken in this case.
Otherwise, if RouteDiscoveryEntry.Received_RREP==FALSE it means that
ThisNode's RREQ was unsuccessful in soliciting a satisfactory RREP. If, in addition, RouteDiscoveryEntry.NumRetries<MAXIMUM_RREQ_RETRIES, ThisNode will invoke the Route Discovery Procedure with SendRreqTime set to IMMEDIATE (see the Route Discovery Procedure above). The timeout associated with this new RREQ MAY be increased. Otherwise, if RouteDiscoveryEntry.NumRetries>=MAXIMUM_RREQ_RETRIES, ThisNode will set a timer to expire at current_time+ROUTE_DISCOVERY_HOLDOFF_TIME. Upon expiry of this timer, the RouteDiscoveryEntry will be removed from the RouteDiscoveryTable.

Response to Route Request Table Timer Expiry

A non-limiting example of how DR engine 402 handles a route request table timer expiration is as follows:
First, ThisNode will remove the RouteRequestEntry from the RouteRequestTable.
If ThisNode is not responsible for the RouteRequestEntry.DestNetwork no more action is taken.
If ThisNode is responsible for RouteRequestEntry.DestNetwork, it will create a RREP message with RREP.WinningPath equal to RouteRequestEntry.WinningPath. If the RouteRequestEntry.DestNetwork is in the same subnet as ThisNode's host interface, the link bandwidths of the WinningPath MAY be omitted.
If the RouteRequestEntry.DestNetwork is not in the same subnet as ThisNode's host interface, RREP.NeedRouteReserve is set to TRUE and the RREP is sent to the network stack with the directive that it be unicast to RouteRequestEntry.OrigId. Otherwise RREP.NeedRouteReserve is set to FALSE and the RREP is sent to the network stack with the directive that it be unicast to the previous node along the winning path.

Response to Route Reply Table Timer Expiry

A non-limiting example of how DR engine 402 handles a route reply table timer expiration is as follows:
Having got this event, ThisNode must have received at least one satisfactory RREP in response to a RREQ originated by ThisNode for DestNetwork and Priority. First, ThisNode will update its priority=Priority route entry to DestAddr so the next hop agrees with the first link in RouteReplyTable[(DestNetwork,Priority)].
Next, ThisNode will create a RRES with
   RRES.DestNetwork equal to DestNetwork.
   RRES.Priority equal to Priority.
   RRES.WinningPath=RouteReplyTableRDestNetwork, PriorityaWinningPath.

ThisNode will pass the RRES to its network stack with the directive that the packet is to be unicast to the next node along RouteReplyTable[(DestNetwork,Priority)].Winning Path.
Next, the RouteReplyTable entry causing the timer event will be removed.

Response to Initiator Timer Expiry

A non-limiting example of how DR engine 402 handles responding to an initiator timer entry is as follows:
If an InitiatorSet entry's timer expires it SHOULD be removed from its corresponding InitiatorSet. If a route entry's InitiatorSet becomes empty then the route SHOULD be replaced with the corresponding entry from proactive engine 406 'table (the InitiatorSet should be empty and DR_route field should be set to false.). If the corresponding proactive engine 406 entry does not exists then the DR route entry will be removed from the RouteTable of appropriate priority.

Response to Proactive Engine Route Table Modification

A non-limiting example of how DR engine 402 handles responding to a proactive engine 406 route table modification is as follows:
First, the previous kernel control route table will be overwritten by proactive engine 406's RouteTable. The proactive engine 406_RouteTable could also be updated. Next, each element of each priority's RouteTable such that RouteTableEntry.DR_route is FALSE will be overwritten by the proactive engine 406 route with the same DestNetwork. This operation clears the RouteTableEntry.InitiatorSet and unsets the IngressTable$_{Priority}$[DestNetwork].PoliceRate. Next, the resulting DR RouteTable is written to the IP forwarding engine.
If proactive engine 406_RouteTable has a route entry with a DestNetwork that is not a DR route table (RouteTable$_{Priority}$), then a new RouteEntry MUST be created and inserted in RouteTable$_{Priority}$. If RouteTable$_{Priority}$ has a RouteEntry with a DestNetwork not in proactive engine 406_RouteTable then the RouteEntry MUST be removed if RouteEntry.DR_route==false. Note: any modification to RouteTable$_{Priority}$ should result in modifying the kernel's forwarding tables for qualified traffic.

Response to Proactive Engine HNA Update

A non-limiting example of how DR engine 402 handles responding to proactive engine 406 HNA unpdate is as follows:
The result of this notification is to simply overwrite DR's existing HNA_Database with the HNA associations from proactive engine 406.

Response to Proactive Engine Neighbor Down Notification

Upon detecting that a neighbor has been lost, proactive engine 406 will send a notification to DR engine 402 indicating the address of the downed neighbor. A non-limiting example of the notification is as follows:
Each RouteEntry in a RouteTable having RouteEntry.NextHopAddress==NeighborAddress will be reverted to its corresponding proactive engine 406 route entry—the proactive engine 406 route matching RouteEntry.DestAddress and RouteEntry.SubnetMask in proactive engine 406_RouteTable. If the corresponding proactive engine 406 route entry does not exist, RouteEntry will be removed from the RouteTable. A modification/removal of a RouteEntry with DR_route==TRUE SHOULD result in a RERR sent to all nodes in the RouteEntry.InitiatorSet.

Response to Forwarding Engine Callback

The routing component on the TSP will periodically notify DR engine 402 with a ForwardedList. The recommended rate of this notification is one notification per second. The elements of the ForwardedList consist of Source/Destination IP address and priorities such that ThisNode has forwarded a qualified packet of Priority P from source node to destination node in the last interval. The Forwarded list should include all traffic that ThisNode's TSP sees, including traffic that is to be dropped (because of ingress policing, for example). A non-limiting example is as follows: DR uses the information in this notification to update the InitiatorSets in the RouteTables. Specifically, this notification is accompanied with a Forwarded List which consists of Source/Destination addresses and priorities in which ThisNode has forwarded a qualified packet of Priority P from Source to Destination recently. Upon getting this notification, ThisNode will update the InitiatorSets in its RouteTable, i.e.

Foreach (src,dst,priority) in Forwarded List:
    SrcNetwork=RouteTable$_{priority}$[src].network( )
    RespNode=HNA_Database[SrcNetwork]
    If NOT ismember(RespNode, RouteTable$_{priority}$[dst].InitiatorSet):
        RouteTable$_{priority}$[dst].InitiatorSet.Add(RespNode)
        TimerSet(RouteTable$_{priority}$[dst].InitiatorSet[RespNode].Timer, now+INITIATOR_STALE_TIME)

It could be the case that HNA_Database[SrcNetwork] returns multiple responsible nodes, in other words, RespNode could be a list of responsible nodes in the code fragment above.

Response to Link Allocation Failure

A non-limiting example of how DR engine 402 handles responding to a Link Allocation Failure is as follows:

A LAF accompanied by a NbrId, and UnsupportedBwList. DR needs to modify some of its routing entries in RouteTable$_{Priority}$ for each Priority in UnsupportedBwList so that some of the traffic is offloaded to another next hop.

There are several considerations when determining which routing entries to modify:

1. Want to move the minimum amount of flows—we don't want our RERR to initiate too many RREQs. The relevant information is provided by the SDBU$_{Priority}$[NbrId] table for this link.
2. Want to change the next hops for destinations whose traffic is increasing most rapidly—
the current link has been shown to have insufficient resources to accommodate additional resource so we don't want to use it for flows that have increasing bandwidth demands. The relevant information is provided by the SDBU$_{Priority}$[NbrId] table for this link.
3. Don't change routes that have recently changed—If a route to DestAddress was recently changed, it SHOULD not be moved.

The algorithm MUST form a per-priority SquelchSet consisting of entries of the form: (Initiator, DestNetwork, AllowableBandwidth). Each entry in the SquelchSet represents a flow (from Initiator to DestNetwork) whose bandwidth needs to be restrained to AllowableBandwidth. To form SquelchSet for Priority, we first consider each (source, dest, bw) in SDBU$_{Priority}$[NbrId] and gather the (source,dest,bw) entries into an auxiliary set, ExpandedSquelchSet, which are not serviceable given the SupportedBwList[Priority]. Note: the sum of the remaining bandwidths not accounted for in the ExpandedSquelchSet (call it serviceableBw) should be ≤LAF.SupportedBw[Priority]. If there is a strict inequality, i.e. if serviceableBw<LAF.SupportedBw[Priority], choose one of the entries in ExpandedSquelchSet (say source=S* and dest=D*) and allow it the residual bandwidth: ExpandedSquelchSet[(S*,D*)].allowableBw= LAF.SupportedBw-serviceableBw (the remainder of the entries in the ExpandedSquelchSet SHOULD have allowableBw set to zero. Next, the SquelchSet is formed from the ExpandedSquelchSet by collapsing the ExpandedSquelchSet's (source,dest) entries into their common (Initiator,DestNetwork) entries. Note: this operation should transfer the "allowableBw" from the (S*,D*) entry of the ExpandedSquelchSet to SquelchSet[(Initiator*,DestNetwork*)].AllowableBandwidth where Initiator*=HNA_Database[RouteTable$_{Priority}$[S*].network( )] and DestNetwork*=RouteTable$_{Priority}$[D*].network( ).

Note a SquelchSet can be empty, for example, if the non-qualified traffic caused the LAF to be issued and there is no qualified traffic for the given priority on the link ThisNode→NbrId. In the event that all SquelchSets are empty, no more processing is done.

Each non-empty SequlchSet will be serialized into the InitiaorsList of a RERR message (note: this operation should encode the affected priorities and allowable bandwidth in the InitiatorsList). The RERR.Fatal flag MUST be set. The RERR MUST be unicast to each individual initiator; TTL of the RERR MUST be set to 0. The IP TTL corresponding to each RRER should be set to be greater or equal to the minimum number of hops required to reach that initiator according to the control route table.

If ThisNode is one of the initiators it will process the RERR in the same manner as the other nodes listed in RERR.Initiators.

Route Entry Update

A non-limiting example of how DR engine 402 handles a route entry update is as follows:

This procedure is invoked with three parameters:
1. DestNetwork
2. NextHop
3. Priority First, ThisNode ensures that the route entry RouteTable$_{Priority}$[DestNetwork] already exists, if not this is an error.

If
    NextHop !=RouteTable$_{Priority}$[DestNetwork].NextHopAddress AND RouteTable$_{Priority}$[DestNetwork].DR_route==TRUE then ThisNode MAY send a RERR to each of the nodes in RouteTable$_{Priority}$[DestNetwork].InitiatorSet. These RERRs MAY have the RRER.Fatal flag set to FALSE indicating that this scenario was not an error situation.

ThisNode then does
    RouteTable$_{Priority}$[DestNetwork].NextHopAddress=NextHop
    RouteTable$_{Priority}$[DestNetwork].DR_route=TRUE
    RouteTable$_{Priority}$[DestNetwork].LastChangedTime=now Also, changing a route entry could modify the kernel's forwarding table for qualified traffic.

DR software architecture 400 including its hybrid, proactive and reactive, protocol may be used in many different application areas such as, for example, by the police in general or during special events, rescue forces during a disaster or an accident, military forces on the battlefield or in training, or for building wireless access areas for communication purposes both for residential and commercial network access. It may also be used in commercial districts for either providing broadband access to enterprises or small companies, or for wireless connections at so-called hotspots. Hotspots are characterized in that they provide communication access within a certain area, for example at an airport lounge or in hotels, for paying customers or free depending on business model.

The routing protocol is independent on the radio-coding scheme used and any radio type may be used. For example, one may mention radio standards as of in the IEEE 802.11 series (e.g. IEEE 802.11a, IEEE 802.11b, IEEE 802.11g and so on), IEEE 802.15, IEEE 802.16, HiperLAN, HomeRF, Bluetooth, IR (Infrared), UWB (Ultra WideBand), JTRS (Joint Tactical Radio System), 3G (Third Generation mobile communication), GPRS (General Packet Radio Service), or EDGE (Enhanced Data rate for Global Evolution). However, the possible radio standards are not limited to the above mentioned. It may be any suitable electromagnetic radiation based transmission schemes operating within the frequency band of 100 kHz to 100 PHz; this includes radio frequencies, microwave frequencies, and frequencies in the infrared, visible, and ultraviolet regimes.

It should also be noted that even though a wireless ad hoc network has been illustrated in the preferred embodiment the same concepts may be applicable to a wired network or fixed wireless network.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A method for determining an efficient route between a source node and a destination node in a network, the method comprising:
    transmitting information from a source node to a destination node over a control channel in the network having a plurality of network nodes until a link event occurs;
    probing the network for at least one alternative route between the source node and the destination node in response to the link event;
    limiting the probing of the network based on a route metric;
    ranking the at least one alternative route and choosing the efficient route based on the ranking of the at least one alternative route, and establishing an offload channel between the source node and the destination node over the efficient route; and
    disabling the offload channel in response to an indication that the control channel no longer suffers from the link event.

2. The method of claim 1, wherein the network is a dynamically changing ad-hoc network, and the method further comprising:
    predetermining with a proactive protocol a number of network nodes between the source node and the destination node; and
    using a reactive protocol for probing the network.

3. The method of claim 1, wherein the network is a dynamically changing ad-hoc network, and the method further comprising:
    receiving at the destination node a plurality of alternative routes between the source node and the destination node and determining the efficient route from among the plurality of alternative routes based on a cost of each alternative route;
    ranking the plurality of alternative routes and choosing the efficient route based on the ranking of the alternative routes, and establishing an offload channel between the source node and the destination node over the efficient route; and
    disabling the offload channel in response to an indication that the control channel no longer suffers from the link event.

4. A method for determining an efficient route between a source node and a destination node in a network, the method comprising:
    transmitting information from a source node to a destination node over a control channel in the network having a plurality of network nodes until a link event occurs;
    probing the network for at least one alternative route between the source node and the destination node in response to the link event;
    limiting the probing of the network based on a route metric including information regarding a required bandwidth necessary for the efficient route, and limiting the probing of the network based on the required bandwidth; and
    receiving at a first network node from the source node the required bandwidth necessary for the efficient route and either (i) transmitting the route metric to a second network node if the first network node has an available bandwidth at least equal to the required bandwidth, or (ii) ceasing the probing from the first network node.

5. The method of claim 4, wherein the route metric includes information regarding a number of network nodes between the source node and the destination node, and the probing of the network is limited based on a number of hops to each network node from the source node to the destination node.

6. The method of claim 5, wherein the link event includes a congestion in the control channel or a link failure in the control channel.

7. The method of claim 6, receiving at the source node the efficient route from the destination node in response to the probing of the network and establishing an offload channel between the source node and the destination node over the efficient route.

8. The method of claim 7, comprising:
    providing a first source node and a second source node; and
    determining whether the destination node has received a first route request message from a first source node and the second source node delaying a second route request message to the destination node until the first source node and the destination node have established the efficient route therebetween.

9. The method of claim 8, receiving at the destination node a plurality of alternative routes between the source node and the destination node and determining the efficient route from among the plurality of alternative routes based on a cost of each alternative route.

10. The method of claim 9, wherein the cost of each alternative route is determined by at least one of the following: available bandwidth on the alternative route, physical resource on the alternative route, common waveforms, and location information.

11. A method for determining an efficient route between a source node and a destination node in a network, the method comprising:
    transmitting information from a source node to a destination node over a control channel in the network having a plurality of network nodes until a link event occurs;
    probing the network for at least one alternative route between the source node and the destination node in response to the link event;
    limiting the probing of the network based on a route metric; and
    receiving at the destination node a plurality of alternative routes between the source node and the destination node and determining the efficient route from among the plurality of alternative routes based on a cost of each alternative route;
    providing a first source node and a second source node; and
    determining whether the destination node has received a first route request message from a first source node and the second source node delaying a second route request message to the destination node until the first source node and the destination node have established the efficient route therebetween.

12. The method of claim 11, comprising predetermining a number of network nodes between the source node and the destination node to limit the probing of the network.

13. The method of claim 12, wherein the network is an ad-hoc network, and the method further comprises dynamically changing the ad-hoc network.

14. The method of claim 13, comprising a reactive protocol and a proactive protocol, wherein the proactive protocol predetermines the number of network nodes between the source node and the destination node, and wherein the reactive protocol probes the network for at least one alternative route between the source node and the destination node in response to the link event.

* * * * *